US007944661B2

(12) United States Patent
Kim

(10) Patent No.: US 7,944,661 B2
(45) Date of Patent: May 17, 2011

(54) PROTECTION CIRCUIT, FLAT DISPLAY DEVICE USING THE SAME, AND METHOD FOR DRIVING FLAT DISPLAY DEVICE USING THE SAME

(75) Inventor: Sang Gyu Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 1357 days.

(21) Appl. No.: 11/478,186

(22) Filed: Jun. 29, 2006

(65) Prior Publication Data

US 2007/0035533 A1 Feb. 15, 2007

(30) Foreign Application Priority Data

Jun. 29, 2005 (KR) ........................ 10-2005-0056916

(51) Int. Cl.

| | |
|---|---|
| ***H02H 3/20*** | (2006.01) |
| ***H02H 3/24*** | (2006.01) |
| *H02H 7/00* | (2006.01) |
| *H02H 9/00* | (2006.01) |
| *H02H 7/06* | (2006.01) |
| *H02H 9/04* | (2006.01) |
| *G09G 3/34* | (2006.01) |
| *G09G 3/36* | (2006.01) |

(52) U.S. Cl. ............. 361/90; 361/18; 361/21; 361/91.1; 345/84; 345/87; 345/102; 345/104

(58) Field of Classification Search ..................... 361/90
See application file for complete search history.

(56) References Cited

U.S. PATENT DOCUMENTS 4,445,092 A 4/1984 Yoshinaka et al.
5,142,235 A 8/1992 Matsumoto et al.
6,567,253 B1 * 5/2003 Herwig et al. ............... 361/91.8
6,809,716 B1 10/2004 Kim
7,196,679 B2 * 3/2007 Jang et al. ....................... 345/60
2002/0170399 A1 * 11/2002 Gass et al. ..................... 83/62.1

(Continued)

FOREIGN PATENT DOCUMENTS

CH 680475 8/1992

(Continued)

OTHER PUBLICATIONS

Office Action dated Feb. 4, 2009 for German Patent Application 10 2006 029 910.8-34.

(Continued)

*Primary Examiner* — Dharti H Patel
(74) *Attorney, Agent, or Firm* — Brinks Hofer Gilson & Lione

(57) ABSTRACT

A protection circuit which is capable of preventing a faulty operation resulting from an abnormal control signal a method for operating the same, a flat display device using the same, and a method for driving the flat display device using the same are disclosed. The protection circuit includes a reference voltage output circuit for outputting a first reference voltage corresponding to a minimum allowable voltage of a control signal and a second reference voltage corresponding to a maximum allowable voltage of the control signal, and a comparison circuit, comparing a level of the control signal with the first reference voltage and second reference voltage and supplying a output control voltage corresponding to the control signal representing the a high-logic state to the controller when the level of the control signal has a value between the first reference voltage and the second reference voltage.

11 Claims, 4 Drawing Sheets

U.S. PATENT DOCUMENTS

| | | | | |
|---|---|---|---|---|
| 2005/0078427 | A1 | 4/2005 | Castro | |
| 2006/0244706 | A1 * | 11/2006 | Kojima ........................... | 345/98 |

FOREIGN PATENT DOCUMENTS

| | | |
|---|---|---|
| CN | 1499461 | 5/2004 |
| DE | 4422173 | 1/1996 |
| DE | 19728783 | 1/1999 |
| DE | 10222149 | 12/2003 |
| DE | 102004044114 | 4/2005 |
| DE | 102005006867 | 9/2005 |
| EP | 1065135 | 4/2005 |

OTHER PUBLICATIONS

Office Action issued in corresponding Chinese Patent Application No. 2006100829867; issued Jun. 6, 2008.

* cited by examiner

PROTECTION CIRCUIT, FLAT DISPLAY DEVICE USING THE SAME, AND METHOD FOR DRIVING FLAT DISPLAY DEVICE USING THE SAME

This application claims the benefit of priority to Korean Patent Application No. 2005-0056916, filed on Jun. 29, 2005, which is hereby incorporated by reference as if fully set forth herein.

TECHNICAL FIELD

This application relates to a flat display device, and more particularly, to a protection circuit for flat display device, which is capable of preventing a faulty operation resulting from an abnormal control signal, a method for driving the same, a flat display device using the same, and a method for driving the flat display device using the same.

BACKGROUND

A liquid crystal display (LCD) device is adapted to display an image by adjusting light transmittance of a liquid crystal using an electric field.

An example of a LCD device includes an LCD module for displaying an image in response to a video data signal in a system, and a pulse width modulation unit for outputting a control signal for control of a microcomputer provided in the system.

The control signal is input to the microcomputer to control the operation thereof. This control signal is an alternating current (AC) signal which alternately has a high-logic voltage and a low-logic voltage. It has a unique duty factor according to the role thereof.

That is, in order to enable the microcomputer to execute various operations, the control signal has various duty factors corresponding to the operations. The duty factor of the control signal is adjusted by a device such as the pulse width modulation (PWM) unit. In response to a command from the user, the PWM unit generates the control signal having a duty factor corresponding to the command and transfers the control signal to the microcomputer.

FIG. 1 is a schematic view illustrating a process of transferring the control signal from the PWM unit to the microcomputer.

As shown in FIG. 1, the control signal output from the PWM unit 186 is input to the microcomputer 196, via an impedance matching circuit 105 and a resistor R2. The impedance matching circuit 105 functions to perform impedance matching between the PWM unit 186 which outputs the control signal and the microcomputer 196 which receives the control signal, so as to prevent the control signal from the PWM unit 186 from being distorted when being inputted to the microcomputer 196. The impedance matching circuit 105 includes a resistor R1 connected between a transmission line 111 and a ground terminal GND, and a capacitor C1 connected in parallel with the resistor R1.

When the output from the PWM unit 186 is abnormal, the control signal may be distorted or have a excess voltage, resulting in damage to the microcomputer 196 which receives the abnormal control signal. That is, the control signal may be input to the microcomputer 196 in the form of an over-voltage signal whose level exceeds a maximum allowable voltage value, or an under-voltage whose level does not reach a minimum allowable voltage value.

SUMMARY

A protection circuit is disclosed which is capable of determining whether an external input control signal is abnormal and selectively supplying or cutting off an output control voltage according to a result of the determination; a method for driving the same; a liquid crystal display device using the same; and, a method for driving the liquid crystal display device using the same.

A protection circuit for flat display device includes: a reference voltage circuit for providing a first reference voltage and a second reference voltage; and a comparison circuit for receiving the control signal through an input terminal, and configured such that a level of the input control signal may be compared with the first reference voltage and second reference voltage and supplying an output control voltage corresponding to, for example, the logical state of the input control signal to the controller or microprocessor only when the level of the control signal has a value between the first reference voltage and the second reference voltage. The first reference voltage corresponds to a minimum allowable voltage of a controller that receives the control signal, and the second reference voltage corresponds to a maximum allowable voltage of a controller that receives the control signal.

The circuit thus accepts an input control signal and compares the input control signal with voltages representing maximum and minimum values of the range of normal values for the control signal and provides an output control signal or voltage when the input control signal is in the range between the maximum and minimum values. The output control signal or voltage is of an appropriate level for input to the controller or microprocessor.

In another aspect, a method for operating a protection circuit for flat display device includes the steps of: comparing a level of an input control signal for control of a controller with a first reference voltage; comparing the level of the control signal with a second reference voltage; and supplying a output control voltage to the controller or microprocessor when the level of the input control signal has a value between the first reference voltage and the second reference voltage.

In yet another aspect, a flat display device includes: a display unit for displaying an image or other information; a driving circuit for operating the display unit such that the display unit displays the image; a system power supply for supplying voltage signals necessary to the driving circuit; a controller or microprocessor for controlling the driving circuit and the system power supply; a pulse width modulation unit for generating a control signal for control of the controller; a reference voltage circuit for providing a first reference voltage and a second reference voltage; and a comparison circuit for receiving the control signal from the pulse width modulation unit; and comparing a level of the control signal from the PWM with the first reference voltage and second reference voltage and supplying a control voltage output to the controller or microprocessor only when the level of the input control signal has a value between the first reference voltage and the second reference voltage.

In a further aspect, a method for driving a flat display device is disclosed, the flat display device including a display unit for displaying an image, a driving circuit for operating the display unit such that the display unit displays the image or other information, a system power supply for supplying voltages necessary to the driving circuit, and a controller for controlling the driving circuit and the system power supply in response to an external control signal, wherein a level of an input control signal is compared with a first reference voltage; the level of the input control signal is compared with a second reference voltage; and, supplying an control voltage to the controller only when the level of the input control signal has a value between the first reference voltage and the second reference voltage.

DETAILED DESCRIPTION

Exemplary embodiments may be better understood with reference to the drawings, but these examples are not intended to be of a limiting nature. Like numbered elements in the same or different drawings perform equivalent functions. When a specific feature, structure, or characteristic is described in connection with an example, it will be understood that one skilled in the art may implement such feature, structure, or characteristic in connection with other examples, whether or not explicitly stated herein. Embodiments may be implemented in hardware, firmware, software, or any combination thereof, and may include instructions stored on a machine-readable medium, which may be read and executed by one or more processors.

Figure 2:
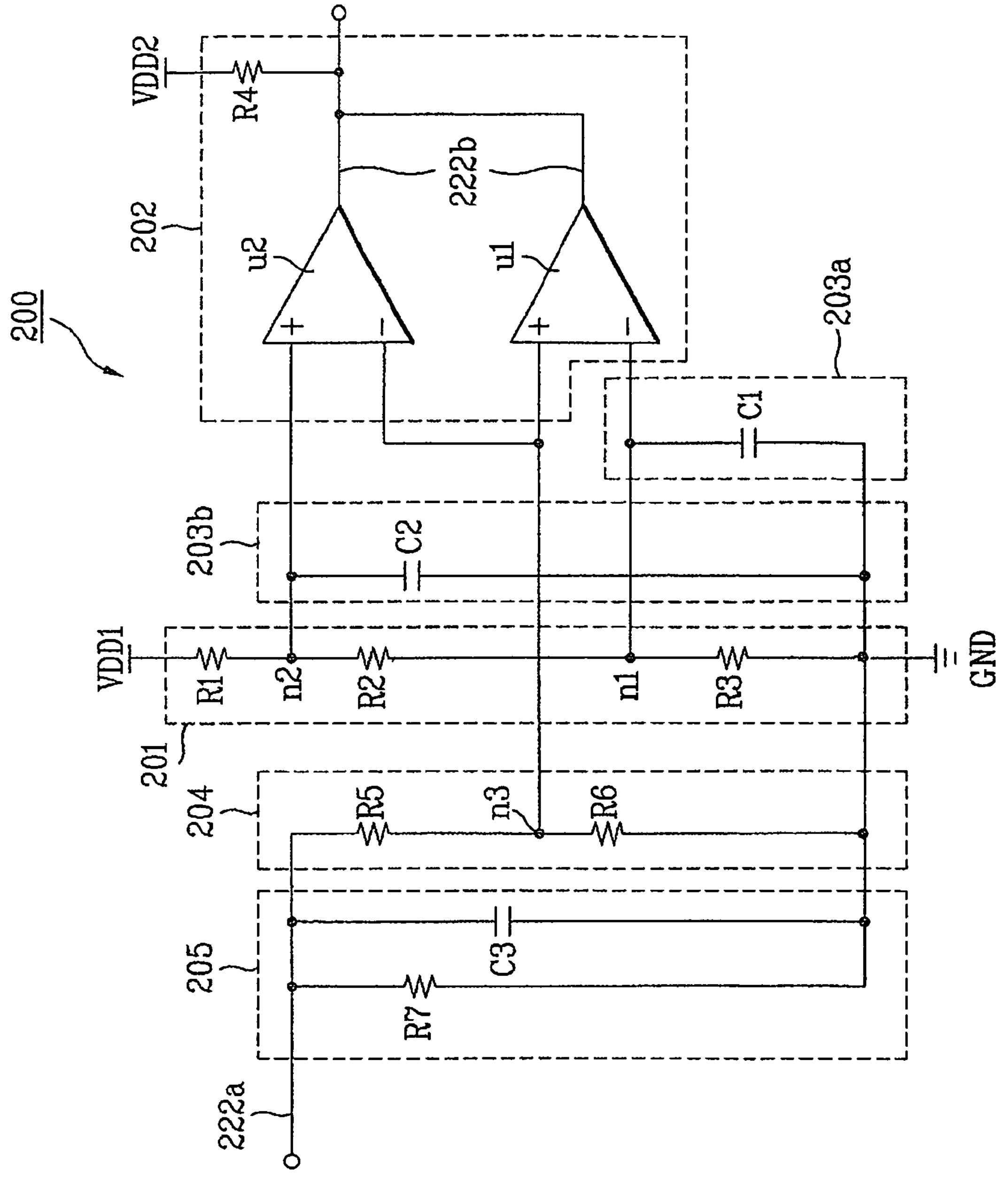
FIG. 2 is a circuit diagram showing the configuration of a protection circuit according to an exemplary embodiment.

In an aspect, the protection circuit 200 shown in FIG. 2 includes a reference voltage output circuit 201 for outputting a first reference voltage corresponding to a minimum allowable voltage of a control signal for control of a controller and a second reference voltage corresponding to a maximum allowable voltage of the control signal, and a comparison circuit 202 for receiving the input control signal through an input terminal 222*a*, the comparison circuit 202 comparing the level of the control signal with the first reference voltage and second reference voltage and supplying an output control voltage corresponding to the control signal to the controller only when the input level of the control signal has a value between the first reference voltage and the second reference voltage.

Figure 3:
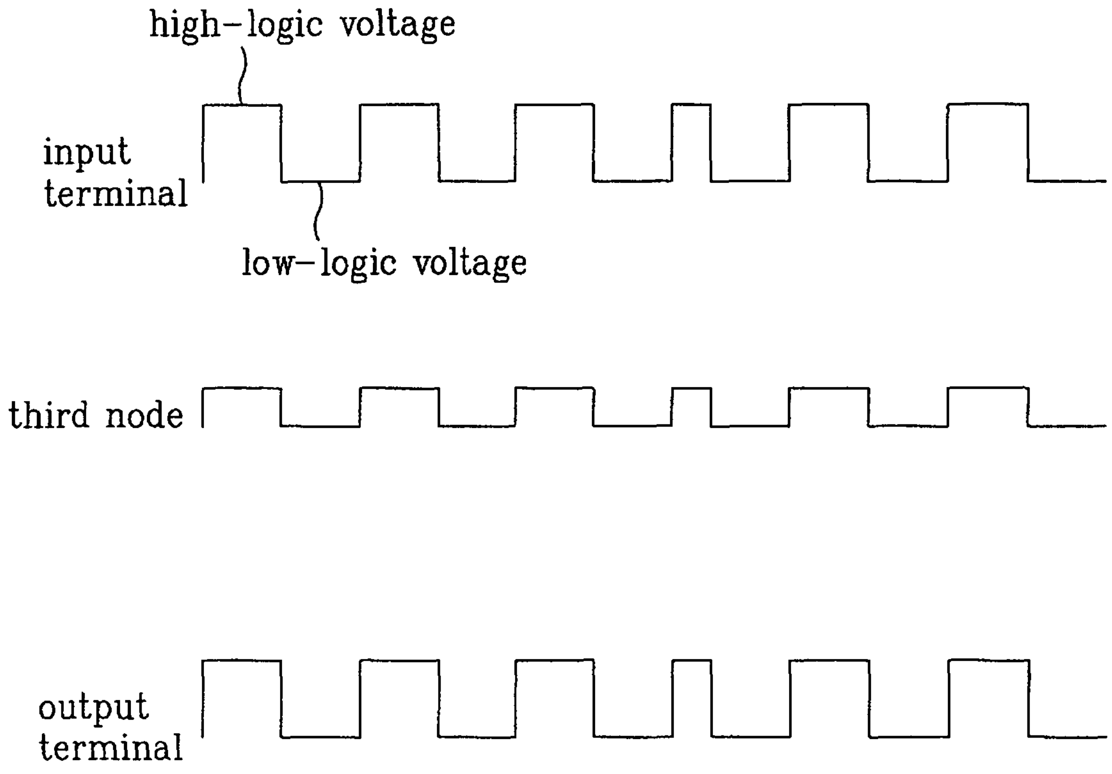
FIG. 3 is a waveform diagram of voltages at an input terminal, third node and output terminal in FIG. 2.

The control signal may be an alternating (AC) signal which has high-logic voltage and low-logic voltage states, as shown in FIG. 3. The control signal has a specific duty factor according to the function being represented. This control signal is input to the controller, such as a microcomputer, to control the operation thereof, where the various duty factors correspond to operations. The duty factor of the control signal may be adjusted by a device such as a PWM unit.

The reference voltage output circuit 201 includes a plurality of resistors R1 to R3 connected in series as a voltage divider between a first voltage source VDD1 and a ground terminal GND, a first node n1 for outputting the first reference voltage; and a second node n2 for outputting the second reference voltage.

The first reference voltage represents the minimum allowable voltage of the control signal, and the second reference voltage represents the maximum allowable voltage of the control signal. The minimum allowable voltage and the maximum allowable voltage represent lower and upper limits of a voltage range of the control signal causing no abnormal operation, respectively. That is, the control signal does not cause a faulty circuit operation when the level thereof has a value between the minimum allowable voltage and the maximum allowable voltage.

The reference voltage output circuit 201 outputs the first and second reference voltages to the comparison circuit 202 so as to provide reference points with which the comparison circuit 202 can determine the level of the currently input control signal at terminal 222*a*. Here, the level of the control signal may mean the normal level of the high-logic voltage thereof. In this regard, the fact that the control signal is normal means that the high-logic voltage of the control signal has a value between the first reference voltage and the second reference voltage.

The comparison circuit 202 includes a second voltage source VDD2 for supplying the output control voltage corresponding to the high-logic voltage level of the control signal, a first comparator u1 for comparing the level of the input control signal with the first reference voltage, and a second comparator u2 for comparing the level of the input control signal with the second reference voltage.

The first comparator u1 has a non-inverting terminal "+" for receiving the control signal from node n3, an inverting terminal "−" for receiving the first reference voltage from node n1, and an output terminal 222*b* to supply an output control voltage from the second voltage source VDD2. The second comparator u2 has an inverting terminal "−" for receiving the control signal from node n3, a non-inverting terminal "+" for receiving the second reference voltage from node n2, and an output terminal 222*b* to supply an output control voltage from the second voltage source VDD2. The output terminal 222*b* of the first comparator u1 and the output terminal 222*b* of the second comparator u2 may be electrically connected with each other and also connected in common to the second voltage source VDD2 through a pull-up resistor R4.

The first and second comparators u1 and u2 may be open drain type comparators. Thus, when the high-logic voltage of the control signal being input to the first comparator u1 is higher than the first reference voltage, a substantially infinite impedance exists at the output terminal 222*b* of the first comparator u1. However, when the high-logic voltage of the control signal input to the first comparator u1 is equal to or lower than the first reference voltage, the output terminal 222*b* of the first comparator u1 is effectively connected to the ground terminal GND.

When the high-logic voltage of the control signal being input to the second comparator u2 is higher than the second reference voltage, the output terminal 222*b* of the second comparator u2 is effectively connected to the ground terminal GND. However, when the high-logic voltage of the control signal being input to the second comparator u2 is equal to or lower than the second reference voltage, a substantially infinite impedance is formed at the output terminal 222*b* of the second comparator u2.

When an infinite impedance exists at the output terminals 222*b* of the first and second comparators u1 and u2, the control voltage from the second voltage source VDD2 is applied to both the output terminals 222*b* of the first and second comparators u1 and u2. As a result, the control voltage at a voltage level of VDD2 appears at the output terminals 222*b* of the first and second comparators u1 and u2. This control voltage output may correspond to the high-logic voltage of the input control signal, or other suitable voltage value, and may be supplied to the controller, microprocessor or other device to be controlled.

The low-logic voltage of the control signal is lower than the high-logic voltage thereof: more particularly, the minimum allowable voltage of the high-logic voltage. The low-logic voltage level is outside of the voltage range defined by the first reference voltage and second reference voltage. Accordingly, when the low-logic voltage of the input control signal is input to the first comparator u1, the output terminal 222*b* of the first comparator u1 is connected to the ground terminal GND When the low-logic voltage of the control signal is inputted to the second comparator u2, a substantially infinite impedance exists at the output terminal 222*b* of the second comparator u2. The reason is that the voltage of the low-logic state of the control signal input to the second comparator u2 is lower than the second reference voltage.

That is, in the case where the low-logic voltage of the control signal is input to each of the first and second comparators u1 and u2, the output terminal 222*b* of the first comparator u1 is connected to the ground terminal GND and the infinite impedance exists at the output terminal 222*b* of the second comparator u2. Accordingly, the control voltage from the second voltage source VDD2 is effectively connected to the ground terminal GND through the output terminals 222*b*. As a result, a ground voltage GND appears at the output terminals 222*b*. The pull-up resistor R4 acts to limit the current drawn when the voltage source VDD2 and the ground terminal GND are effectively connected.

The protection circuit 200 may also include a first stabilizer 203*a* for stabilizing the first reference voltage output from the first node n1, and a second stabilizer 203*b* for stabilizing the second reference voltage output from the second node n2. The first stabilizer 203*a* may include a capacitor Cl connected between the first node n1 and the ground terminal GND, and the second stabilizer 203*b* may include a capacitor C2 connected between the second node n2 and the ground terminal GND.

A signal attenuator 204 may also connected between the input terminal 222*a* and the comparison circuit 202. The signal attenuator 204 functions to receive the control signal at the input, attenuate the input control signal by a predetermined ratio and supply the attenuated input control signal to the comparison circuit 202. The control signal may be a signal for control of the operation of the controller, and the level thereof may be higher than a value receivable by the comparison circuit 202. For this reason, the signal attenuator 204 divides the level of the input control signal by a predetermined ratio to attenuate it to a level receivable by the first and second comparators u1 and u2, and supplies the attenuated control signal to the first and second comparators u1 and u2. The first and second reference voltages input, respectively, to the first and second comparators u1 and u2 have levels set on the basis of the attenuated control signal. The output control voltage supplied from the second voltage source VDD2 may be a voltage level corresponding to the level of the control signal prior to its attenuation; namely, the high-logic voltage of the original control signal, or such other value as may be desirable for controlling the circuit to be controlled.

The signal attenuator 204 may include two impedance elements connected in series between the input terminal 222*a* and the ground terminal GND, and a third node n3 between the two impedance elements for outputting an attenuated signal. The attenuation ratio of the control signal is determined by the resistance ratio of the two impedance elements. Each of impedance elements comprises one or more resistors. For example, in one embodiment, the signal attenuator 204 includes two resistors R5 and R6 shown in FIG. 2. The attenuation ratio of the control signal is determined by the resistance ratio of the two resistors R5 and resistor R6. The attenuation ratio of the control signal is determined by the resistance ratio of the two resistors R5 and resistor R6.

Figure 1:
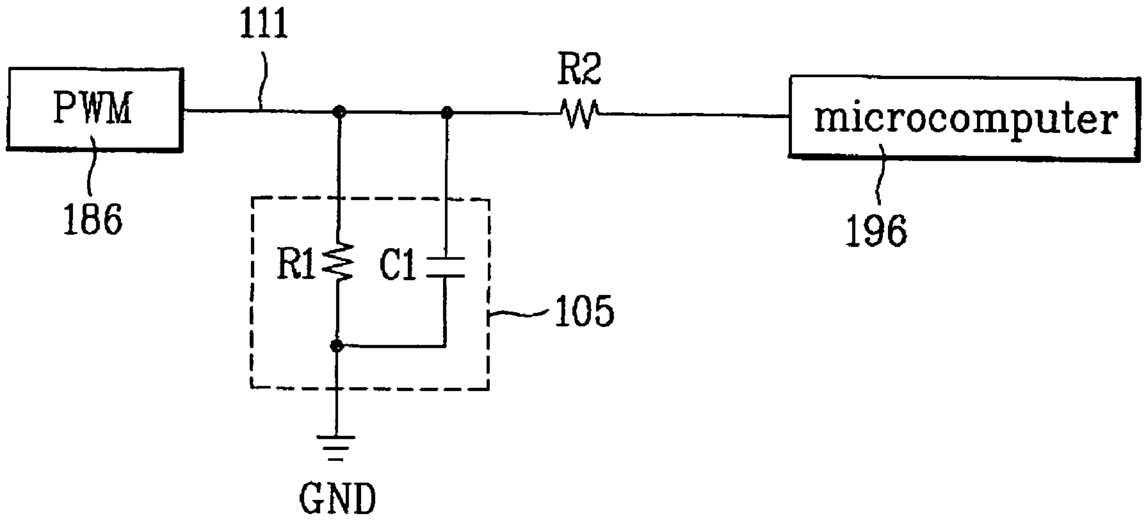
FIG. 1 Related Art
FIG. 1 is a schematic view illustrating a related art process of transferring a control signal from a PWM unit to a microcomputer.

An impedance matching circuit 205 may also be provided between the signal attenuator 204 and the input terminal 222*a*. The impedance matching circuit 205 may act to reduce the distortion of the control signal The impedance matching circuit 205 functions to perform impedance matching between an external device which outputs the control signal, such as the PWM 186 (See FIG. 1) and the protection circuit 200 which receives the control signal, so as to reduce the distortion of the control signal from the external device when being input to the protection circuit 200.

The impedance matching circuit 205 may include a resistor R7 connected in series between the input terminal 222*a* and the ground terminal GND, and a capacitor C3 connected in parallel to the resistor R7.

FIG. 3 is a waveform diagram of voltages at the input terminal 222*a*, the third node n3, and output terminal 222*b* in FIG. 2.

A control signal generator such as a PWM unit generates a control signal as shown in the top trace in FIG. 3 and the control signal is applied to the input terminal 222*a* of the protection circuit 200. In this illustration, the high-logic voltage of the control signal is shown as the first part of control signal waveform.

The control signal may be input to the signal attenuator 204 through the impedance matching circuit 205. The signal attenuator 204 attenuates the control signal voltage by the predetermined ratio and supplies the attenuated high-logic voltage at third node n3 to the comparison circuit 202. The signal attenuator 204 inputs the attenuated control signal to both the non-inverting terminal "+" of the first comparator u1 and the inverting terminal "−" of the second comparator u2.

The reference voltage output circuit 201 divides the voltage from the first voltage source VDD1 to generate the first and second reference voltages. The reference voltage output circuit 201 then inputs the first reference voltage to the inverting terminal "−" of the first comparator u1 and inputs the second reference voltage to the non-inverting terminal "+" of the second comparator u2.

The first comparator u1 compares the attenuated control signal voltage with the first reference voltage. When the attenuated control signal voltage is higher than the first reference voltage, the first comparator u1 exhibits a substantially infinite impedance at the output terminal 222*b* thereof.

The second comparator u2 compares the attenuated control signal voltage with the second reference voltage. When the attenuated control signal voltage is equal to or lower than the second reference voltage, the second comparator u2 exhibits a substantially infinite impedance at the output terminal 222*b* thereof.

This is, the situation which obtains when the attenuated control signal voltage has a value between the first reference voltage and the second reference voltage and represents a "normal" state of the high-logic state control signal voltage. When the high-logic voltage is "normal", the first and second comparators u1 and u2 exhibit a substantially infinite impedance at the output terminals 222*b* thereof. The control voltage from the second voltage source VDD2 is applied to both the output terminals 222*b*. The control voltage applied to the output terminals 222*b* may thus also be supplied to the controller, wherein the control voltage may have a level corresponding to a desired level of the control signal prior to its attenuation, and representing a high-logic state. As a result, the controller is operated with the control voltage.

On the other hand, when the high-logic voltage has a value outside of the range between the first reference voltage and the second reference voltage, the output terminal 222*b* of at least one of the first and second comparators u1 and u2 will be connected to the ground terminal GND. That is, when the control signal voltage is lower than the first reference voltage, the first comparator u1 connects the output terminal 222*b* thereof to the ground terminal GND and the second comparator u2 loads the infinite impedance at the output terminal 222*b* thereof.

When the attenuated high-logic voltage is higher than the second reference voltage, the first comparator u1 exhibits an infinite impedance at the output terminal 222*b* thereof and the second comparator u2 connects the output terminal 222*b* thereof to the ground terminal GND. The output terminal 222*b* of at least one of the first and second comparators u1 and u2 is effectively connected to the ground terminal GND in this manner, and the control voltage from the second voltage source VDD2 is also effectively connected to the ground terminal GND, so that the ground voltage is applied to the output terminals 222*b*. The ground voltage applied to the output terminals 222*b* is then supplied to the controller. As a result, the controller is not operated.

When the attenuated control signal represent a low-logic state the low-logic voltage is always lower than the minimum allowable voltage of the attenuated high voltage control signal value, the first comparator u1 connects the output terminal 222*b* thereof to the ground terminal GND and the second comparator u2 exhibits the infinite impedance at the output terminal 222*b* thereof. As a result, the protection circuit 200 supplies the ground voltage to the controller as the output control voltage.

In summary, when the input control voltage representing high-logic voltage is normal, the controller is operated with the control signal consisting of the high-logic voltage and the low-logic voltage (ground voltage). In contrast, when the high-logic voltage is abnormal, the controller is supplied with the ground voltage.

The descriptions presented herein use a "positive" logic description and configuration. It will be apparent to a person of ordinary skill in the art that a low control voltage may be considered to be associated with a high-logic state and that a high control voltage may be associated with a low-logic state. Further, the polarities of all voltages may be inverted.

The protection circuit 200 can be used in the flat display device, such as a liquid crystal display device, organic light emitting display (OLED) device, etc.

Next, a detailed description will hereinafter be given of a liquid crystal display (LCD) device including the protection circuit 200 with the above-stated configuration.

Figure 4:
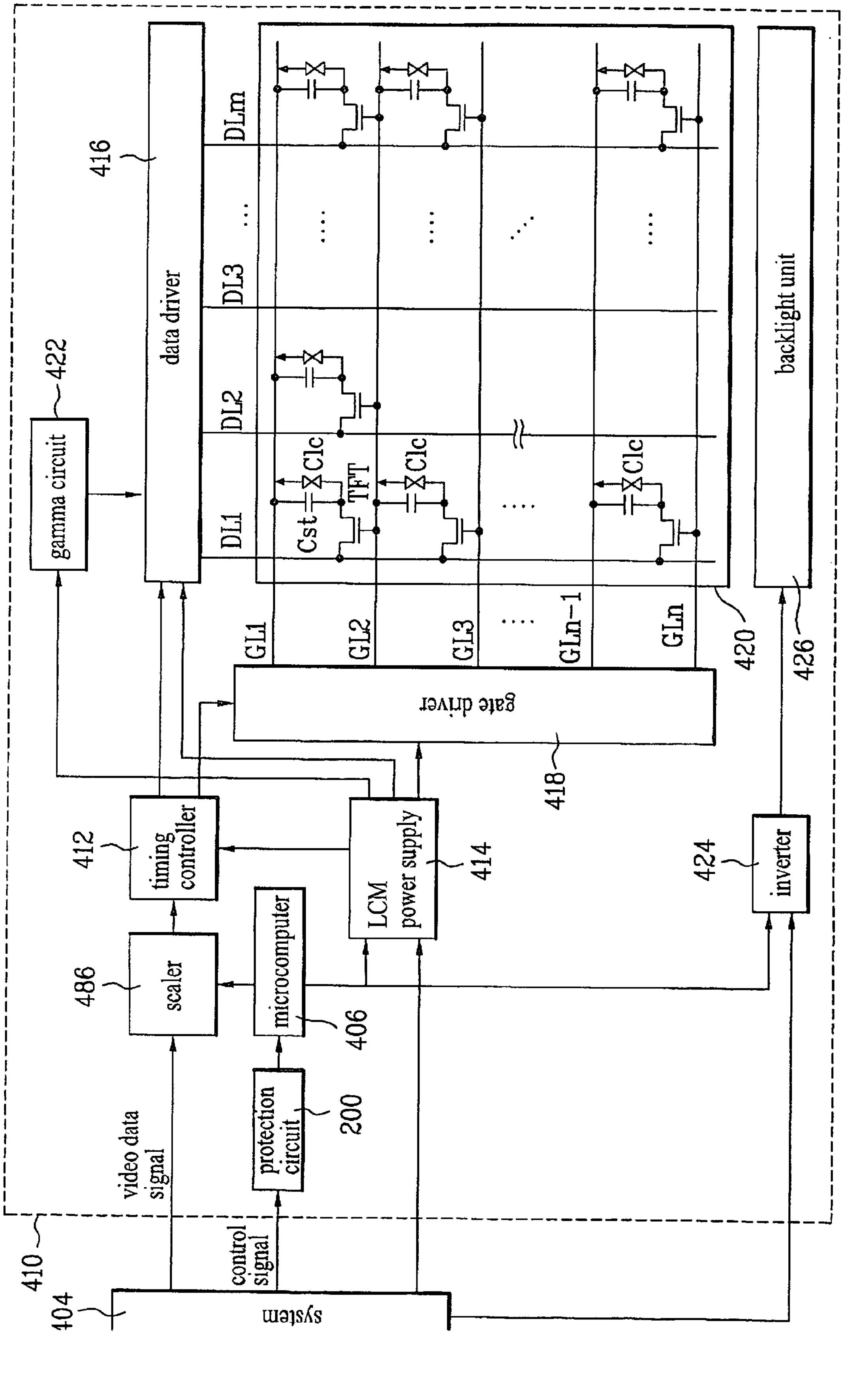
FIG. 4 is a schematic view of a liquid crystal display device including the protection circuit of FIG. 2.

FIG. 4 is a schematic view of the LCD device with the protection circuit 200 of FIG. 2.

The LCD device shown in FIG. 4 includes an LCD module 410 for displaying an image in response to a video data signal from a system 404, a PWM unit (not shown) in the system 404 for generating a control signal for control of a microcomputer 406 provided in the LCD module 410, and the protection circuit 200, which is connected between the PWM unit and the microcomputer 406.

The system 404 includes a graphics card (not shown) for supplying a video data signal, and other signals appropriate to the LCD module 410, and a system power supply(not shown) for supplying power.

The graphics card converts a video data signal input thereto into a format appropriate to the resolution of a liquid crystal panel 420 and supplies the resulting video data signal to the LCD module 410. The graphics card also generates signals, such as a main clock signal, vertical synchronous signal and horizontal synchronous signal, appropriate to the resolution of the liquid crystal panel 420.

The system power supply supplies drive voltages necessary to the graphic card. The system power supply also supplies corresponding drive voltages to an LCM power supply 414 and inverter 424 of the LCD module 410.

The microcomputer 406 in the LCD module 410 may control the ON/OFF status of the system power supply in response to a user command from the PWM unit in the system 404.

In other words, the microcomputer 406 controls the supply of a voltage to the LCM power supply 414 and the supply of a lamp voltage to the inverter 424 through the system power supply. In particular, the microcomputer 406 controls a time that the system power supply supplies the voltage to the LCM power supply 414 and a time that the system power supply supplies the lamp voltage to the inverter 424 such that these times are different. The microcomputer 406 may control an ON/OFF time of the system power supply and an ON/OFF time of the LCM power supply 414 such that they are the same. The microcomputer 406 may control an ON/OFF time of the inverter 424 such that the ON time is later than the ON time of the system power supply and the OFF time is earlier than the OFF time of the system power supply.

The LCD module 410 includes the liquid crystal panel 420, which includes liquid crystal cells, a data driver 416 for driving data lines DL1 to DLm of the liquid crystal panel 420, a gate driver 418 for driving gate lines GL1 to GLn of the liquid crystal panel 420, and a timing controller 412 for controlling driving timings of the data driver 416 and gate driver 418. The LCD module 410 further includes the LCM power supply 414, which generates drive voltages necessary for driving of the LCD module 410, a gamma circuit 422 for supplying a gamma voltage to the data driver 416, a backlight unit 426 for providing light necessary for image display to the liquid crystal panel 420, the inverter 424, which acts to supply a drive voltage to the backlight unit 426; and, a scaler 486 which scales the resolution of the video data signal from a graphic card.

The LCM power supply 414 generates the drive voltages (a base drive voltage Vcc, gate high voltage signal Vgh, gate low voltage signal Vgl, gamma reference voltage, common voltage, and the like) necessary for the driving of the LCD module 410 using one or more voltages supplied from the system power supply and supplies the generated drive voltages to the timing controller 412, data driver 416, the gate driver 418 and the gamma circuit 422.

The timing controller 412 communicates the video data signal from the graphic card to the data driver 416.

The timing controller 412 generates signals, such as timing signals for control of the timing of the data and gate drivers 416 and 418, and a polarity inversion signal, in response to the signals from the graphics card.

The liquid crystal panel 420 includes thin film transistors TFT formed, respectively, at intersections of the 'n' gate lines GL1 to GLn and the 'm' data lines DL1 to DLm, and liquid crystal cells connected respectively to the thin film transistors TFT and arranged in the form of a matrix.

Each of the thin film transistors TFT may transfer a video data signal from an associated data line DL1 to DLm to a liquid crystal cell in response to a gate high voltage signal from an associated one of the gate lines GL1 to GLn. Each liquid crystal cell may be equivalently electronically expressed as a liquid crystal capacitor Clc The liquid crystal cell may be provided with a pixel electrode connected to the associated thin film transistor, a common electrode facing the pixel electrode and a liquid crystal between the pixel electrode and the common electrode. The liquid crystal cell may include a storage capacitor Cst connected to a gate line of the previous stage for maintaining a data voltage charged in the liquid crystal capacitor Clc until the next data voltage is charged therein.

The gate driver 418 sequentially supplies the gate high voltage signal to the gate lines GL1 to GLn in response to signals from the timing controller 412. The gate driver 418 also supplies the gate low voltage signal to the gate lines GL1 to GLn in a period other than a period in which the gate high voltage signal is applied.

The data driver 416 converts the video data signal from the timing controller 412 into a video voltage signal, which may be an analog signal, and supplies the video voltage signal to the data lines DL1 to DLm on a horizontal line-by-horizontal line basis in a horizontal period in which the gate high voltage signal is supplied to the gate lines GL1 to GLn. The gamma circuit 422 supplies the data driver 416 with a gamma voltage preset to have a different voltage level according to the voltage level of the video data signal. As a result, the data driver 416 converts the video data signal into the video voltage signal by using the gamma voltage from the gamma circuit 422.

The inverter 424 converts the voltage from the system power supply in the system 404 into, for example, a high AC voltage necessary for lighting of a lamp of the backlight unit 426 and supplies the high AC voltage to the backlight unit 426. Other means of supplying the illumination are known and may be used, including "white light" diodes, multiple color light emitting diodes, and the like The protection circuit 200 may the same or equivalent in configuration and method of operation to that of FIG. 2.

The protection circuit 200 compares the level of the control signal from the PWM unit in the system 404 with first and second predetermined reference voltages and determines, according to the comparison results, whether to supply the output control signal to the microcomputer 406. When the level of the control signal has a value between the first reference voltage and the second reference voltage, the protection circuit 200 determines the control signal to be normal, and then supplies the control signal to the microcomputer 406. On the other hand, when the level of the control signal has a value outside of the range between the first reference voltage and the second reference voltage, the protection circuit 200 determines the control signal to be abnormal, and then blocks the supply of the control signal to the microcomputer 406, so as to prevent a faulty operation of the microcomputer 406.

Thus, the protection circuit monitors the control signal which is supplied to the controller, and blocks the supply of the control signal to the controller when the level of the control signal is beyond the predetermined allowable voltage range. Therefore, the protection circuit of the present invention can prevent a faulty operation of the controller resulting from an abnormal control signal.

Although only a few exemplary embodiments have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

What is claimed is:

1. A protection circuit for flat display device comprising:

an input terminal inputting an input PWM (Pulse Width Modulation) control signal, having a high-logic voltage and a low-logic voltage;

a signal attenuator attenuating the input PWM control signal, wherein the signal attenuator attenuates the high-logic voltage of the input PWM control signal;

a reference voltage circuit dividing a first driving voltage from a first voltage source into a first reference voltage and a second reference voltage and outputting the first reference voltage and the second reference voltage, wherein the first reference voltage corresponds to a minimum allowable voltage of the attenuated high-logic voltage and the second reference voltage corresponds to a maximum allowable voltage of the attenuated high-logic voltage; and a comparison circuit comparing the attenuated PWM signal with the first reference voltage and second reference voltage and then outputting an output PWM control signal corresponding to the input PWM control signal to an output terminal, or a ground voltage to the output terminal, wherein the comparison circuit comprises;

a second voltage source supplying a high-logic output voltage of the output PWM control signal to the output terminal through a pull-up resistor, the high-logic output voltage corresponding to the high-logic voltage of the input PWM control signal;

a first comparator comparing the attenuated PWM signal with the first reference voltage, so that an output terminal of the first comparator is an infinite impedance state or outputs the ground voltage; and a second comparator comparing the attenuated PWM signal with the second reference voltage, so that an output terminal of the second comparator is the infinite impedance state or outputs the ground voltage, wherein the output terminal of the comparison circuit is commonly connected to the output terminals of the first and second comparators, and wherein the high-logic voltage of the input and output PWM control signals is higher than a voltage receivable by the first and second comparators.

2. The protection circuit as set forth in claim 1, wherein the reference voltage output circuit comprises:

a plurality of resistors connected in series between the first voltage source and a ground terminal;

a first node for outputting the first reference voltage;

a second node for outputting the second reference voltage;

a first capacitor connected between the first node and the ground terminal for stabilizing the first reference voltage; and a second capacitor connected between the second node and the ground terminal for stabilizing the second reference voltage.

3. The protection circuit as set forth in claim 1, wherein the output terminal of the comparison circuit outputs the high-logic output voltage, when the attenuated high-logic voltage is higher than the first reference voltage and is equal to or lower than the second reference voltage so that the both output terminals of the first and the second comparators being the infinite impedance state;

the ground voltage, when the attenuated high-logic voltage is lower than the first reference voltage so that the output terminal of the first comparator outputs the ground voltage and the output terminal of the second comparator is the infinite impedance state; and the ground voltage, when the attenuated high-logic voltage is higher than the second reference voltage so that the output terminal of the second comparator outputs the ground voltage and the output terminal of the first comparator is the infinite impedance state.

4. The protection circuit as set forth in claim 1, further comprising an impedance matching circuit connected between the input terminal and the reference voltage output circuit for performing impedance matching.

5. The protection circuit as set forth in claim 4, wherein the impedance matching circuit comprises:

a resistor connected between the input terminal and a ground terminal; and a capacitor connected in parallel to the resistor.

6. A flat display device comprising:

a display unit for displaying an image an image;

a driving circuit for operating the display unit such that the display unit displays the image;

a system power supply;

a timing controller for controlling the driving circuit and the system power supply;

a back light unit providing light into a liquid crystal panel;

an inverter driving the back light unit;

a power supply supplying voltage signals necessary to a gate driver, a data driver and the timing controller;

a protection circuit outputting an output PWM (Pulse Width Modulation) control signal corresponding to an input PWM control signal; and a controller controlling the power supply and the inverter in response to the output PWM control signal from the protection circuit, wherein the controller ON and OFF times of the power supply and the inverter so that the ON time of the inverter is later than the ON time of the power supply and the Off time of the inverter is earlier than the OFF time of the power supply, wherein the protection circuit includes:

an input terminal inputting the input PWM control signal, having a high-logic voltage and a low-logic voltage;

a signal attenuator attenuating the input PWM control signal, wherein the signal attenuator attenuates the high-logic voltage of the input PWM control signal;

a reference voltage circuit dividing a first driving voltage from a first voltage source into a first reference voltage and a second reference voltage and outputting the first reference voltage and the second reference voltage; wherein the first reference voltage corresponds to a minimum allowable voltage of the attenuated high-logic voltage and the second reference voltage corresponds to a maximum allowable voltage of the attenuated high-logic voltage; and a comparison circuit comparing the attenuated PWM signal with the first reference voltage and second reference voltage and then outputting the output PWM control signal corresponding to the input PWM control signal to an output terminal, or a ground voltage to the output terminal, wherein the comparison circuit comprises;

a second voltage source supplying a high-logic output voltage of the output PWM control signal to the output terminal through a pull-up resistor, the high-logic output voltage corresponding to the high-logic voltage of the input PWM control signal;

a first comparator comparing the attenuated PWM signal with the first reference voltage, so that an output terminal of the first comparator is an infinite impedance state or outputs the ground voltage; and a second comparator comparing the attenuated PWM signal with the second reference voltage, so that an output terminal of the second comparator is the infinite impedance state or outputs the ground voltage, wherein the output terminal of the comparison circuit is commonly connected to the output terminals of the first and second comparators, and wherein the high-logic voltage of the input and output PWM control signals is higher than a voltage receivable by the first and second comparators.

7. The flat display device as set forth in claim 6, wherein the reference voltage circuit comprises:

a plurality of resistors connected in series between the first voltage source and a ground terminal;

a first node for outputting the first reference voltage;

a second node for outputting the second reference voltage;

a first capacitor connected between the first node and the ground terminal for stabilizing the first reference voltage; and a second capacitor connected between the second node and the ground terminal for stabilizing the second reference voltage.

8. The flat display device as set forth in claim 6, wherein the output terminal of the comparison circuit outputs the high-logic output voltage, when the attenuated high-logic voltage is higher than the first reference voltage and is equal to or lower than the second reference voltage so that the both output terminals of the first and the second comparators being the infinite impedance state;

the ground voltage, when the attenuated high-logic voltage is lower than the first reference voltage so that the output terminal of the first comparator outputs the ground voltage and the output terminal of the second comparator is the infinite impedance state; and the ground voltage, when the attenuated high-logic voltage is higher than the second reference voltage so that the output terminal of the second comparator outputs the ground voltage and the output terminal of the first comparator is the infinite impedance state.

9. The flat display device as set forth in claim 6, further comprising an impedance matching circuit connected between the input terminal and the reference voltage output circuit for performing impedance matching.

10. The flat display device as set forth in claim 9, wherein the impedance matching circuit comprises:

a resistor connected between the input terminal and a ground terminal; and a capacitor connected in parallel to the resistor.

11. The flat display device as set forth in claim 6, wherein the flat display device is LCD.

* * * * *